Figure 1:
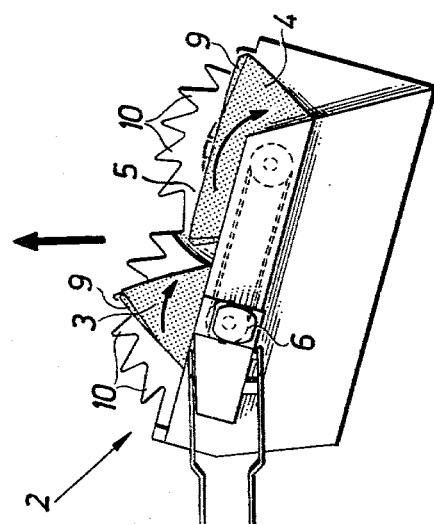
Figure 1:
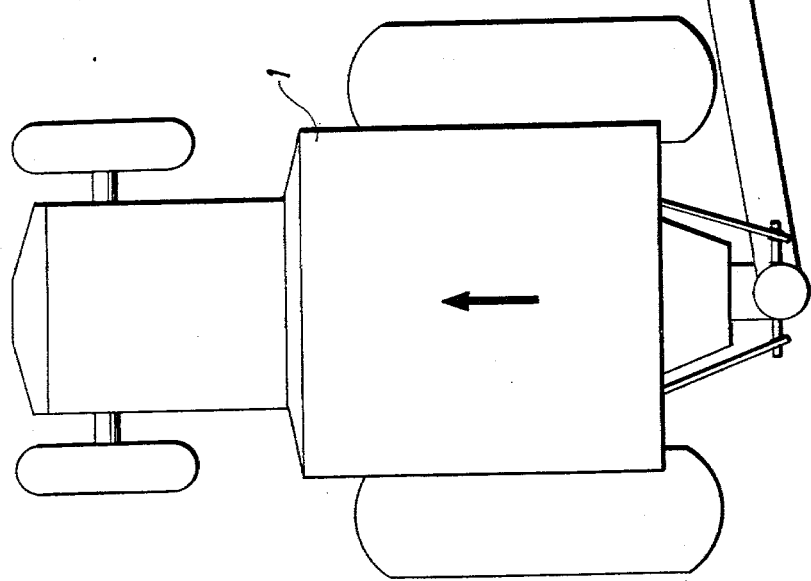

United States Patent [19]

Hallberg

[11] 4,250,699
[45] Feb. 17, 1981

[54] CLIPPING APPARATUS

[76] Inventor: Jören R. Hallberg, PL. 4707, S-761 00 Norrtälje, Sweden

[21] Appl. No.: 28,448

[22] Filed: Apr. 9, 1979

[30] Foreign Application Priority Data

Apr. 14, 1978 [SE] Sweden .............................. 7804271

[51] Int. Cl.³ ............................................ A01D 55/26
[52] U.S. Cl. ..................................... 56/235; 56/13.6; 56/295
[58] Field of Search ................. 56/234, 235, 13.6, 295

[56] References Cited

U.S. PATENT DOCUMENTS

| Re. 25,379 | 5/1963 | Swanson | 56/13.6 |
|---|---|---|---|
| 2,038,284 | 4/1936 | Hanson | 56/13.6 |
| 2,550,144 | 4/1951 | Flintver | 56/295 |
| 2,765,611 | 10/1956 | King | 56/295 |
| 3,080,696 | 3/1963 | Wood | 56/13.6 |
| 3,261,156 | 7/1966 | Fitzgerald | 56/13.6 |
| 3,851,390 | 12/1974 | Neal | 56/295 |
| 3,972,158 | 8/1976 | Lindstrom | 56/13.6 |

Primary Examiner—Robert A. Hafer
Attorney, Agent, or Firm—Fred Philpitt

[57] ABSTRACT

A clipping apparatus for bushes and grass intended to be attached to a tractor or like vehicle and comprising two rotatable blades having cutting edges. The blades are operative to produce a clipping action in co-operation with an underlying toothed means. One of the blades, when seen in the direction of movement of the apparatus, is mounted somewhat behind the other blade, and the blades are located on mutually different levels. The distance between the centers of rotation of the blades is greater than the radius of the circle defined by the tips of the cutting edges but shorter than the diameter of said circle. The blades are arranged to rotate in the same direction.

5 Claims, 2 Drawing Figures

CLIPPING APPARATUS

The present invention relates to an apparatus for clipping bushes and grass, and which is intended to be attached to a tractor or like towing vehicle, said apparatus comprising at least two rotatable blades provided with cutting edges, which blades are arranged to cooperate with an underlying toothed device in a manner such as to produce a cutting action.

In known clipping apparatus of the aforedescribed kind, all of which are intended solely for grass or like organic matter, problems occur when they are to be propelled by means of a tractor or like towing vehicle, since they do not have the necessary capacity, e.g. the cut grass is not moved away quickly enough, but collects in front of the apparatus and prevents effective clipping. In other apparatus strips of un-clipped grass are left between the blades.

A main object of the present invention is to provide a clipping apparatus of the aforedescribed kind, which enables effective clipping of both bushes and grass when moved by means of a tractor or like vehicle and in which the problem of the removal of clipped grass or the problem of strips of unclipped grass are not found.

This object is achieved in accordance with the invention by the fact that one of the blades, when seen in the direction of movement of the apparatus, is mounted somewhat behind the other blade, that the blades are located on mutually different levels, that the distance between the centres of rotation of the blades is greater than the radius of the circle defined by the tips of the cutting edges but shorter than the diameter of said circle, and that the blades are arranged to rotate in the same direction.

It is preferred that behind each cutting edge as seen in the direction of rotation of the blades is arranged a wing upstanding from the respective blade and that the cutting edges of the foremost blade at the forward clipping edge of the apparatus move in a direction towards the rear blade. Further, it is preferred that the rear blade is located on a lower level than the foremost blade and the apparatus is constructed to permit free passage of clipped material over the apparatus out-side the drive shaft of the rear blade.

By means of this embodiment the cut grass and bushes are effectively thrown laterally outwardly by means of an air-stream generated by the wings and due to both blades impart to the grass a movement in the same direction. Further, there is no obstacle to prevent clippings from passing outwardly.

Figure 2:
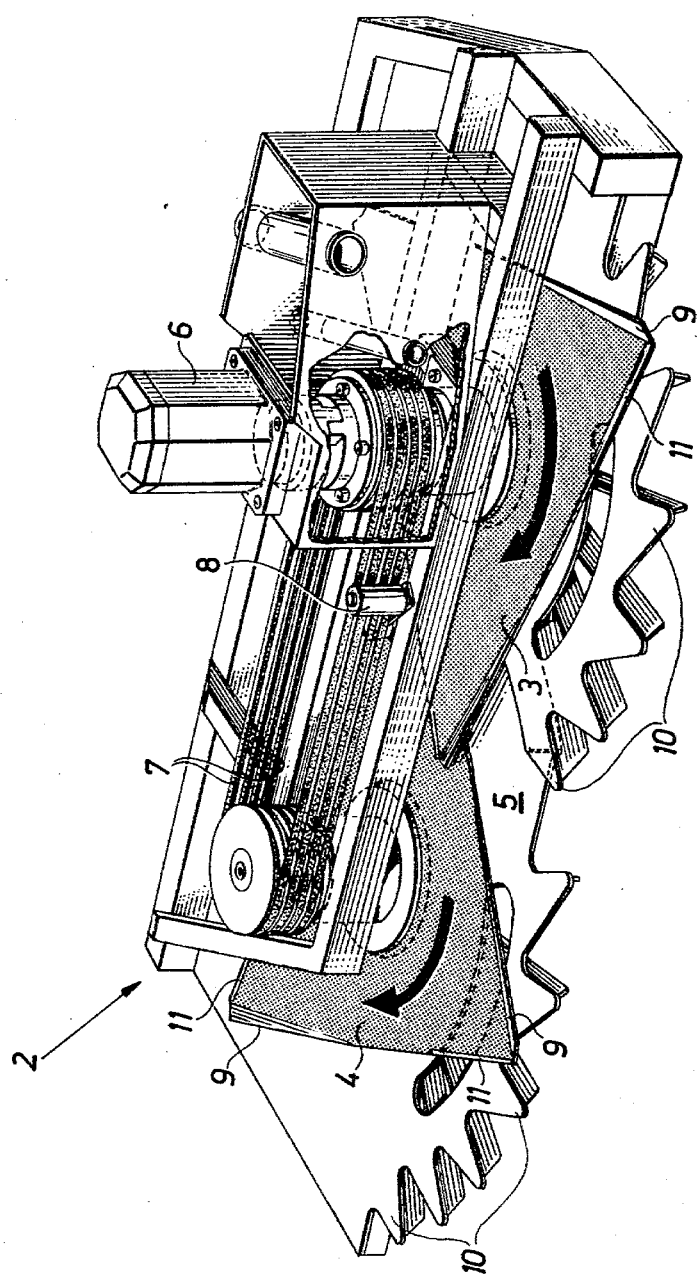

So that the invention will be more readily understood and optional features thereof made apparent, an exemplary embodiment of the invention will now be described with reference to the accompanying schematic drawings, in which FIG. 1 illustrates a tractor having mounted thereto a clipping apparatus according to the invention, and FIG. 2 is a perspective view of the clipping apparatus with the outer casing removed.

In FIG. 1 there is illustrated a tractor 1 to which is attached a clipping apparatus 2 constructed in accordance with the invention. The clipping apparatus comprises two triangular blades 3 and 4, both of which are driven in the direction shown by the arrows on the blades, i.e. clockwise or outwardly as seen from the tractor. The blades rotate above a lower, stationary plate 5 provided with teeth 10, which plate is moved by the tractor 1 close to the ground and substantially parallel therewith. As will be seen, the clipping apparatus 2 forms an angle with the movement direction, i.e. a line through the centre of rotation of the blades 3 and 4 forms a small angle with a line which extends at right angles to the direction of movement of the apparatus. This angle is preferably from 15° to 20°. The blades overlap each other to a considerable extent. To this end the blades are located at different levels, the outer blade 4 being located on a lower level than the inner blade 3.

As can best be seen from FIG. 2, the two blades 3 and 4 are driven by a common motor, suitably a hydraulic motor. The motor is mounted in the centre of the inner blade 3, the outer blade 4 being driven by means of a driving belt 7. The reference 8 identifies a device for tightening the belt. The apparatus has the form of a self-supporting box-beam structure, which can be attached to one end of a hydraulic arm or the like.

The aforedescribed apparatus enables both grass and bushes to be clipped effectively, since the blades overlap each other to a certain extent, thereby ensuring that no strips of uncut grass are left in the centre, and that the cut grass is thrown out laterally in a very effective manner, thereby ensuring that the cut grass does not present an obstacle to further clipping. This is, inter alia, achieved by the fact that the two blades 3 and 4 rotate in the same direction, outwardly as seen from the tractor, and that the outer blade 4 is located further rearwardly than the inner. Further, as beforementioned, the outer blade 4 is located on a lower level than the inner blade 3, and the apparatus is so constructed that the cut grass can readily pass over the outer end of the apparatus. No upstanding parts are present, outside those means required for driving the outer blade 4.

Further, in order for the clipped grass to be thrown effectively outwardly, it is important that the blades have a very small number of cutting edges 11, in the illustrated embodiment three cutting edges, which are formed by the outer parts of the side edges of the triangles. To further improve this outwardly throwing of the cut grass, the outer parts of the edges of the triangles which do not serve as cutting edges are provided with upstanding wings 9, which may form an angle with the vertical plane, preferably an angle of about 45° and which generate an airstream throwing cut grass outwardly. These wings also cause a suction effect bringing the grass in front of the apparatus to raise resulting in an improvement of the clipping result.

The use of triangular blades has been found of great advantage, since they form an effective clipping angle with the teeth 10 of the plate 5, said teeth being constructed in a manner to cause the material to be clipped in the best possible manner and to form a holding means for the grass as it is clipped by the blades. As will be seen, the number of teeth 10 is considerably greater than the number of cutting edges 11. The blades of the illustrated embodiment are particularly easy to produce and are robust and rigid and also enable relatively thick bush stems to be cut. The blades are arranged to rotate at very high speeds, i.e. 1000–1500 rpm, suitably about 1500 rpm.

Instead of being mounted obliquely in relation to the direction of movement thereof, the apparatus may be constructed such that the outer blade 4 lies somewhat behind the inner blade 3. The apparatus according to the invention can also be modified in other respects. For example it may be provided with three or more blades the shape of which may be changed as desired.

What is claimed is:

1. A clipping apparatus for bushes and grass that is adapted to be attached to a tractor or similar vehicle, said apparatus comprising:
   (a) two generally planar blades having cutting edges,
   (b) each blade being mounted for rotation about separate substantially vertical axes that are spaced far enough apart so that the cutting paths of the blades will overlap, said blades being mounted on mutually different levels,
   (c) means to rotate said blades in the same direction,
   (d) a stationary toothed member located immediately below each rotatable blade, each toothed member being adapted to cooperate with the rotatable blade immediately above it to effect a clipping action on grass and bushes that come between said teeth,
   (e) said blades being mounted with respect to the ground so that when their relative positional relationship is considered relative to the direction of forward movement of the cutting apparatus, one blade will be ahead of the other, and
   (f) an upstanding wing located behind the cutting edge of each blade, which wings will generate an air stream to throw cut grass outwardly and cause a suction effect to raise the grass in front of the blades.

2. A cutting apparatus according to claim 1 wherein said wing forms an angle with the vertical plane.

3. A clipping apparatus according to claim 1 wherein the cutting edges of the foremost blade at the foward clipping edge of the apparatus move in a direction outwardly towards the rear blade.

4. A clipping apparatus according to claim 1 wherein the rear blade is located on a lower level than the foremost blade.

5. A clipping apparatus according to claim 1 constructed to permit free passage of clippings over the apparatus outside the drive shaft of the rear blade.

* * * * *